United States Patent [19]

Dagard

[11] Patent Number: 5,082,618
[45] Date of Patent: Jan. 21, 1992

[54] METHOD AND DEVICE FOR MODIFYING THE CONCENTRATION OF THE SOLUBLE POISON CONTAINED IN THE COOLING FLUID OF THE PRIMARY CIRCUIT OF A NUCLEAR REACTOR

[75] Inventor: Philippe Dagard, Marly le Roi, France

[73] Assignee: Framatome, Courbevoie, France

[21] Appl. No.: 365,582

[22] Filed: Jun. 13, 1989

Related U.S. Application Data

[63] Continuation-in-part of Ser. No. 245,971, Sep. 19, 1988, abandoned, which is a continuation of Ser. No. 461,064, Jan. 26, 1983, abandoned.

[30] Foreign Application Priority Data

Jan. 27, 1982 [FR] France .................. 82 01249

[51] Int. Cl.$^5$ .............................................. G21C 7/06
[52] U.S. Cl. .................... 376/219; 376/306; 376/313; 376/328
[58] Field of Search ............... 376/219, 221, 222, 306, 376/308, 328, 313, 315

[56] References Cited

U.S. PATENT DOCUMENTS

| | | | |
|---|---|---|---|
| 3,365,367 | 9/1966 | Dolle | 376/219 |
| 4,148,708 | 4/1979 | Grant | 204/301 |
| 4,161,447 | 7/1979 | Kojima | 210/639 |
| 4,364,900 | 12/1982 | Burrill | 376/306 |

*Primary Examiner*—Brooks H. Hunt
*Assistant Examiner*—Frederick H. Voss
*Attorney, Agent, or Firm*—Pollock, Vande Sande & Priddy

[57] ABSTRACT

The method consists in removing the cooling fluid of the primary circuit, and, as a function of the cooling fluid concentration, in passing either all of the cooling fluid into at least one electrodialysis module, or only a part of the cooling fluid into the electrodialysis modules and the other part towards at least one reverse osmosis apparatus, in adding to the cooling fluid, when it leaves the primary circuit, an additive to promote dissociation of the boric acid, and in then returning the cooling fluid into the primary circuit.

3 Claims, 8 Drawing Sheets

FIG_1

FIG_3

FIG_5

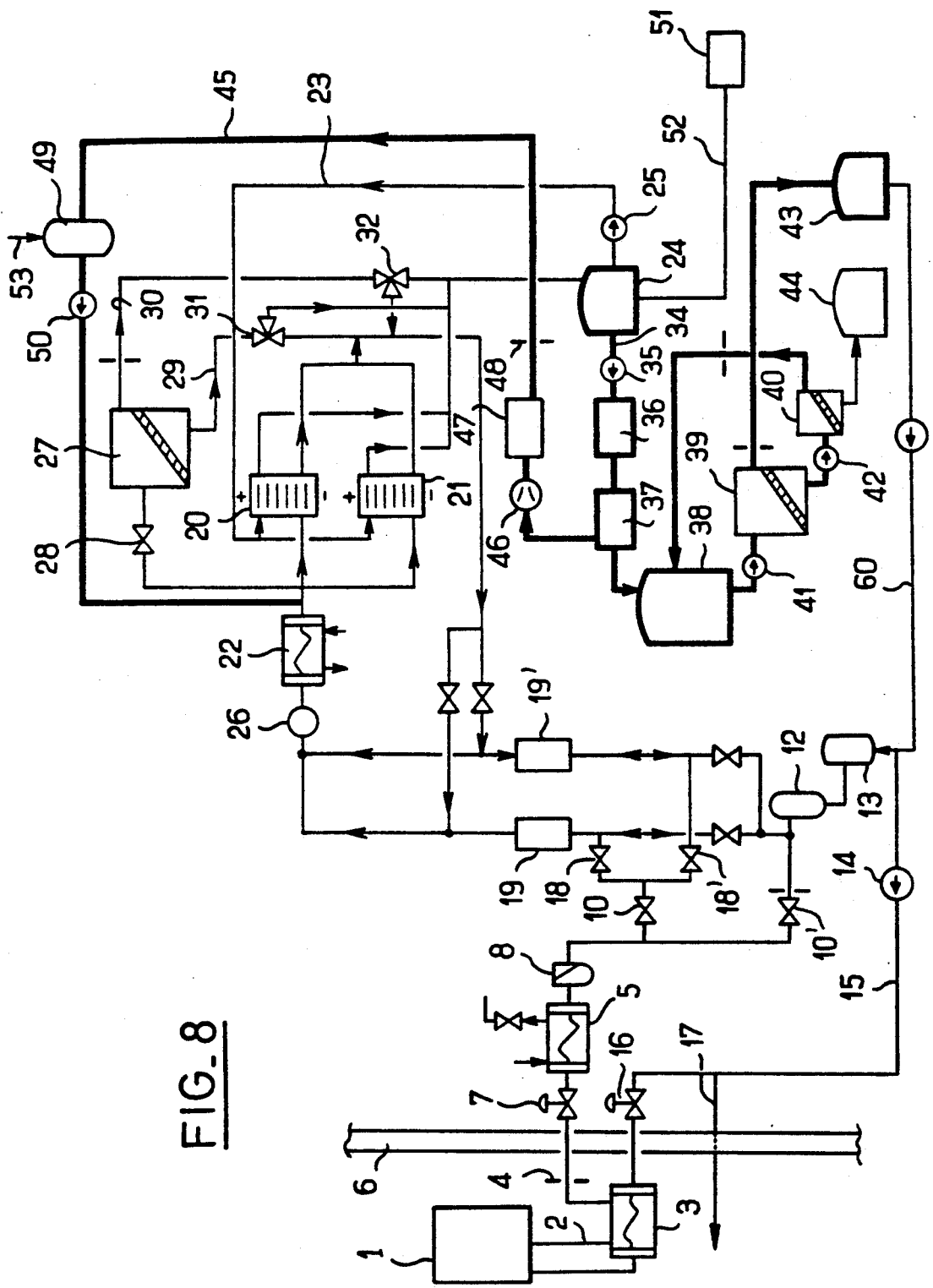
FIG._8

METHOD AND DEVICE FOR MODIFYING THE CONCENTRATION OF THE SOLUBLE POISON CONTAINED IN THE COOLING FLUID OF THE PRIMARY CIRCUIT OF A NUCLEAR REACTOR

REFERENCE TO RELATED APPLICATION

This is a continuation-in-part of U.S. patent application Ser. No. 245,971, filed Sept. 19, 1988 (itself a continuation of U.S. application Ser. No. 461,064, filed Jan. 26, 1983, and abandoned).

FIELD OF THE INVENTION

The present invention is concerned with adjustment of the reactivity of a pressurized-water nuclear reactor (PWR).

BACKGROUND OF THE INVENTION

Slow variations of the reactivity in pressurized-water nuclear reactors consist of an adjustment of the concentration of a soluble poison in the coolant of the primary circuit. These reactivity variations are essentially due to depletion of the fuel during the cycle, to poisoning of the core by the production of fission products such as xenon, or to changes in the temperature of the coolant between cold stopping and hot stopping conditions. The soluble poisons commonly used may be gadolinium or boric acid salts.

It is conventional to adjust the concentration of the soluble poison in the coolant by injecting a concentrated solution of poison or by diluting the coolant. This latter operation leads to the formation of a large volume of effluents which must be processed before reuse in the primary circuit or before disposal.

To avoid having to process these effluents before their reuse or disposal, it has been attempted to reduce the volume of effluents obtained during adjustment of the concentration of the poison in the coolant. For example, in French Patent FR-A-1,598,608, in order to modify the concentration of soluble poison in the coolant, use is made of ion exchange resins loaded with poison and whose reserve capacity during flowing of the coolant is modified by varying their operating temperature, i.e., that of the coolant. Fixing of the poison on the ion exchange resins takes place at a temperature of the order of 0° to 40° C., and its release occurs at a temperature of the order of 60° to 90° C.

Thus, the effluents are stored in the resins and are not discharged. There is therefore no problem as to the reprocessing of these effluents.

French Patent FR-A-1,477,058 also discloses a method for processing cooling fluid, in which the concentration of dissolved boric acid is adjusted by bringing the cooling fluid into contact with an ion exchange resin which retains the boric acid, the resin is regenerated with a caustic alkali which removes the boric acid from the resin, and the boric acid and the regenerating agent are separated by electrodialysis.

However, although the methods described in these patents do not have the drawback of the formation of a large volume of effluents, they have two other main drawbacks. In fact, these methods permit only slow variation of the soluble-poison concentration and adjustment of only certain concentrations of poison situated in a range which is a function of the resins.

SUMMARY OF THE INVENTION

The present invention aims to overcome these drawbacks and relates to a method for modifying the concentration of boric acid in the form of a soluble poison contained in the cooling fluid of the primary circuit of a nuclear reactor, in which the cooling fluid is removed from the primary circuit and, as a function of the cooling fluid concentration, either all of the cooling fluid is passed into at least one electrodialysis module, or only a part of the cooling fluid is passed into the electrodialysis modules, the other part being directed towards at least one reverse osmosis apparatus, an additive intended to promote the dissociation of the boric acid is added to the cooling fluid when it leaves the primary circuit, and the cooling fluid is then conveyed back into the primary circuit.

According to another feature of the invention, the additive is ammonia solution, and the ammonia solution content of the cooling fluid of the primary circuit is readjusted upstream of the electrodialysis modules and of the reverse osmosis apparatus.

The invention also relates to a device for implementing this method, comprising a first closed circuit connected to a primary circuit, a second closed circuit connected to the primary effluent tank, these two circuits both passing through at least one common electrodialysis module and the first circuit comprising at least one reverse osmosis apparatus, means for injecting an additive into the primary fluid and means for eliminating the additive from the cooling fluid when it returns towards the primary circuit.

BRIEF DESCRIPTION OF THE DRAWINGS

So that it may be more easily understood, the invention will now be described more precisely with reference to the accompanying drawings, in which:

FIG. 8 is a diagrammatic view showing operation of the plant during processing of the effluents and recycling of the ammonia.

DESCRIPTION OF PREFERRED EMBODIMENT

Figure 1:
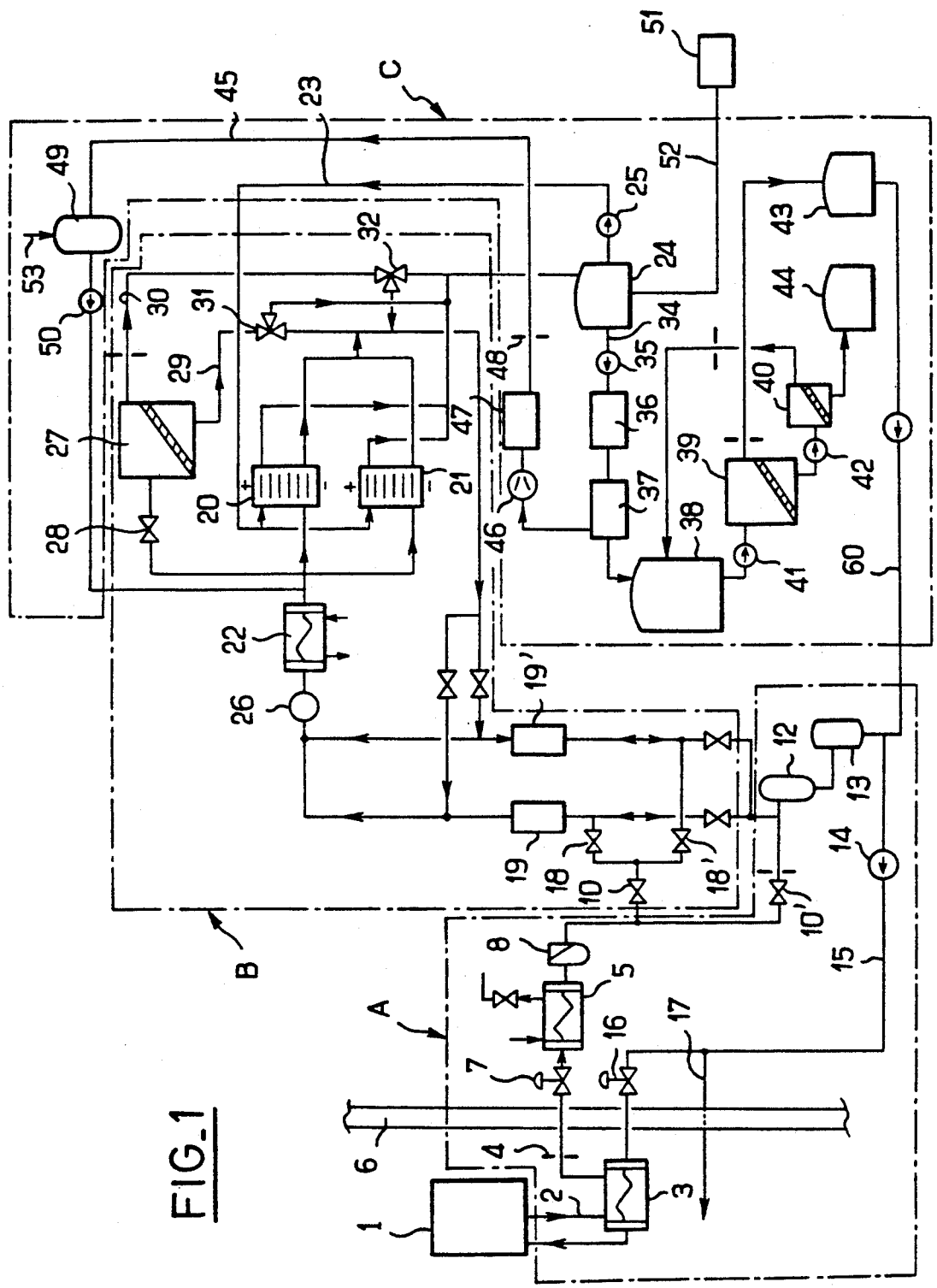
FIG. 1 is a schematic view of a plant for modifying the concentration of soluble poison in the cooling fluid of the primary circuit of a nuclear reactor.

The plant shown in FIG. 1 is intended to modify the concentration of the soluble poison contained in the cooling fluid of the primary circuit 1 of a nuclear reactor, the cooling fluid consisting of boric acid diluted from 2000 to 100 ppm (parts per million) of boron.

Generally, this plant comprises a circuit A for chemical and volumetric monitoring of the main primary circuit, a circuit B for modifying the boron concentration of the primary circuit, and a circuit C for processing the effluents and recycling the ammonia.

The cooling fluid is removed from the primary circuit 1 by means of a duct 2 connecting a cold branch of a loop of the primary circuit 1 to the inlet on the hot side of a heat exchanger 3. The outlet of the heat exchanger 3 is connected, by means of pressure-reducing orifices 4, to a second heat exchanger 5 which further cools the cooling fluid to a temperature of between 30° and 80° C. The heat exchanger 3 and the pressure-reducing orifices 4 are located inside a sealed enclosure, the wall 6 of which is shown, while the remainder of the plant is located on the outside. A valve 7, if necessary, allows the circuit for modifying the concentration of the poison to be isolated from the primary enclosure. After passing into the exchanger 5, the cooling fluid is filtered at 8.

The circuit A also comprises a dimineralizer 12 of the mixed bed type, the anionic resins of which are saturated with boron, and a volumetric monitoring tank 13. By means of a feed pump 14, the tank 13 is connected to the cold inlet of the exchanger 3 by a line 15 provided with a regulation valve 16. The tank 13 is also connected to the controlled leakage seals of the primary pumps by a line 17.

The circuit B for modifying the boron concentration of the primary circuit comprises two cationic resin beds 19 and 19', a heat exchanger 23, two electrodialysis modules 20 and 21 and a reverse osmosis apparatus 27.

The effluent processing and ammonia recycling circuit C comprises first of all a tank 24 which stores the primary liquid effluents such as those discharged from bleeders and vents, valve outlets, etc. of the primary circuit 1 (indicated in the drawings by the reference 51 and pipes to the tank 24 by the line 52). The tank 24 is connected by a line 23 to the inlet of each electrodialysis module 20 and 21. Circulation of the effluents in the line 23 is ensured by a pump 25.

Furthermore, the circuit C has a line 34 leaving the tank 24 from which the effluents are removed by means of a pump 35. The line 34 conveys the effluents first of all into a mixed-bed demineralizer 36 in which the anionic resins are saturated with boron and the cationic resins are saturated with ammonium (NH$_4$), and then into a module 37 for thermal dissociation of the ammonium borates, and a tank 38.

This circuit C also comprises two reverse osmosis apparatuses 39 and 40 mounted in series, two pumps 41 and 42 and two tanks 43 and 44.

The module 37 has leaving it a line 45 allowing readjustment of the ammonia solution content of the electrodialysis modules 20 and 21 and of the reverse osmosis apparatus 27. For this purpose, the line 45 comprises a compressor 46, a tank 47, a pressure-reducer 48, a tank 49 provided with a water inlet 53 and a pump 50.

With reference now to FIGS. 2 to 8, the mode of operation of the plant will be described.

Figure 2:
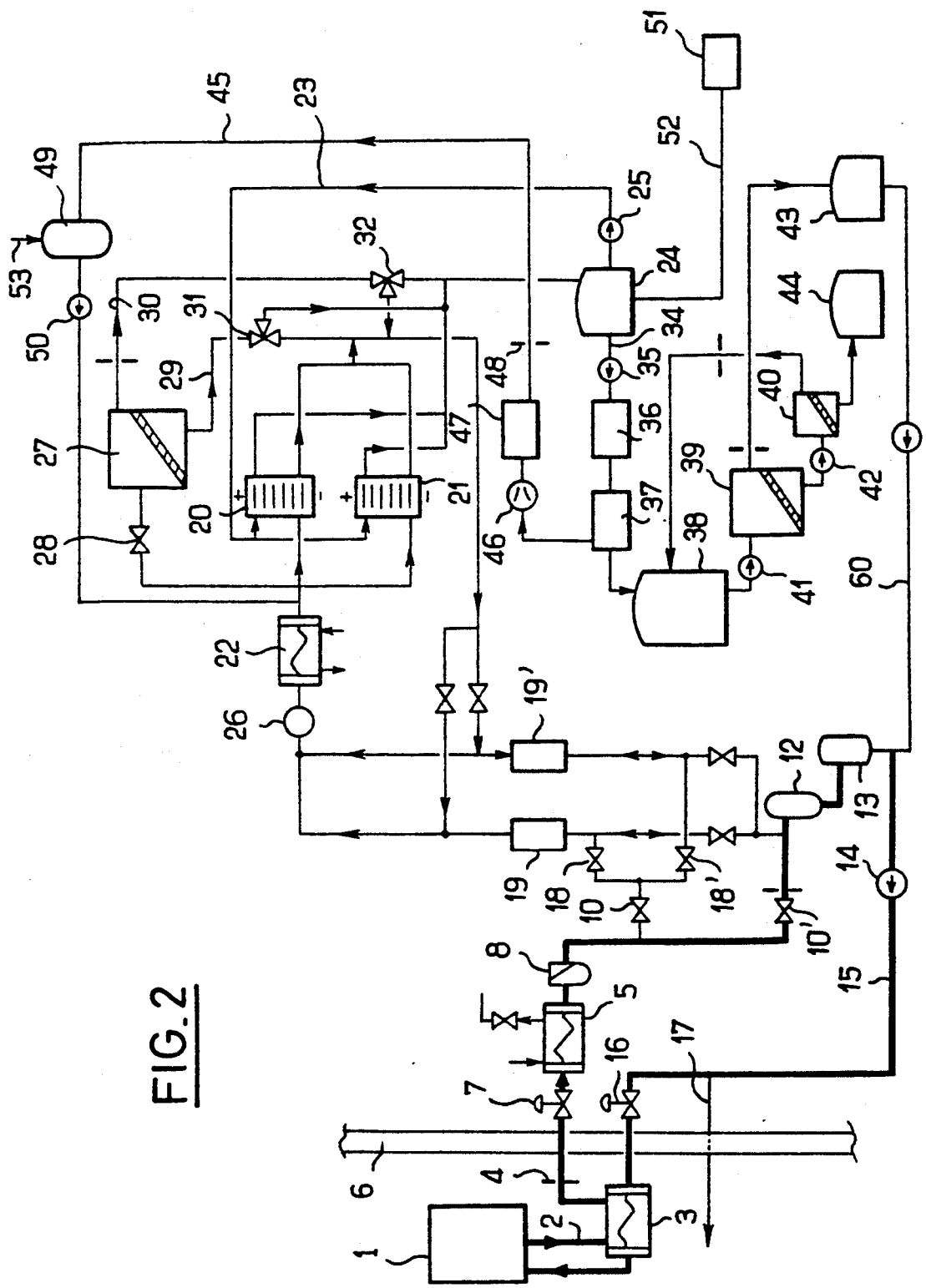
FIG. 2 is a schematic view showing operation of the plant when the soluble-poison concentration in the cooling fluid is normal.

If the boron concentration, which has been measured beforehand in respect of the primary circuit, is correct, the valve 10 remains closed whereas the valve 10' opens in order to allow the cooling fluid to enter into the demineralizer 12 and the volumetric monitoring tank 13. The cooling fluid therefore flows normally inside the circuit A as shown in FIG. 2.

Figure 3:
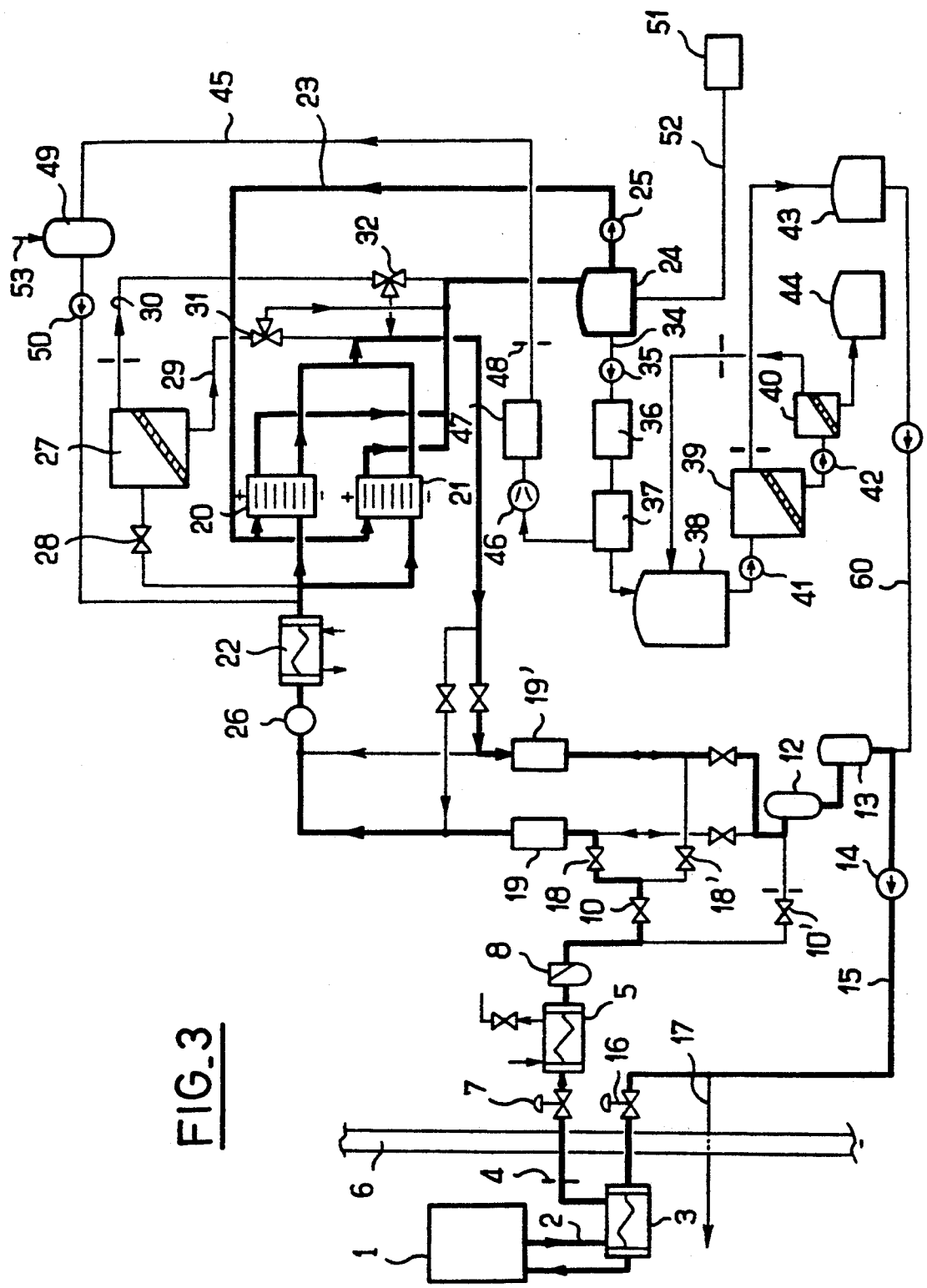
FIG. 3 is a schematic view showing operation of the plant with respect to the electrodialysis modules when the soluble-poison concentration in the cooling fluid is not normal.

If the soluble-poison concentration of the cooling fluid is not correct, the valve 10' remains closed, whereas the valve 10 opens in order to allow the cooling fluid to enter into the circuit B for modifying the boron concentration of the primary circuit as shown in FIG. 3.

Opening of the valve 18 allows the cooling fluid to pass over the bed of cationic resins 19 initially saturated with cations (NH$_4$+ for example) and to extract from the latter ions which increase its base content. This promotes dissociation of the boric acid contained in the fluid before the latter enters into the electrodialysis modules 20 and 21. The efficiency of these modules is thus increased.

Before entering into the electrodialysis modules 20 and 21, the temperature of the fluid is further lowered to a temperature of between 30° and 50° C. by the heat exchanger 22.

The electrodialysis modules 20 and 21 are identical and each consist of compartments separated by membranes. Preferably, these membranes are of limited thickness and have a good mechanical strength, it being possible to use, for example, membranes which have a thickness of less than 1 mm and the surface area of which amounts to 1 m$^2$. These membranes are alternately cationic and anionic.

The cationic membranes allow only the cations to pass through, while the anionic membranes allow only the anions to pass through. The end compartments of the electrodialysis modules are provided with electrode plates 20a and 20b supplied by a direct current, and the polarity of these electrodes may, moreover, be reversed, as will be seen further on during the operational description of these apparatuses.

Figure 4:
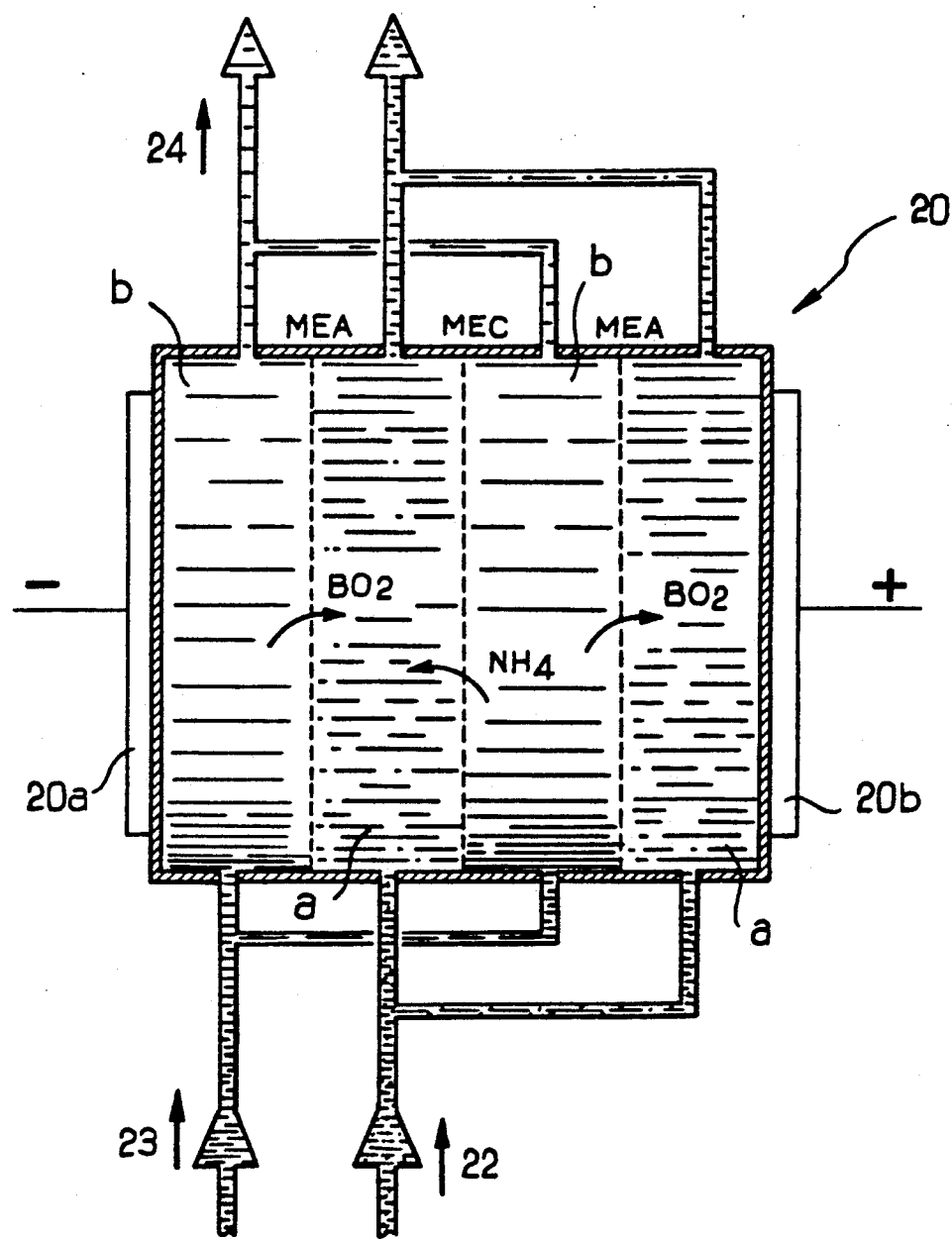
FIGS. 4 and 5 are two schematic views showing operation of the electrodialysis modules.
Figure 5:
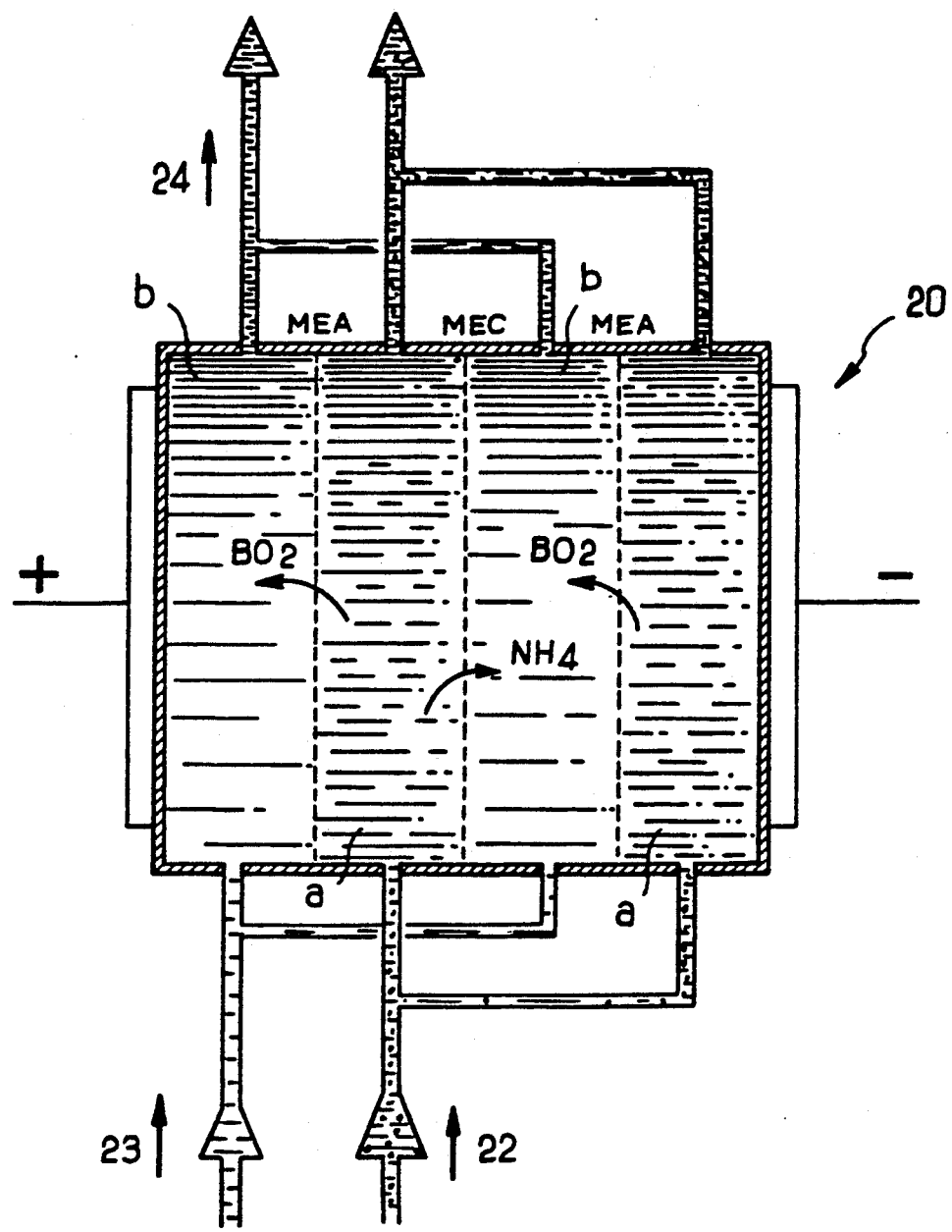
Figure 6:
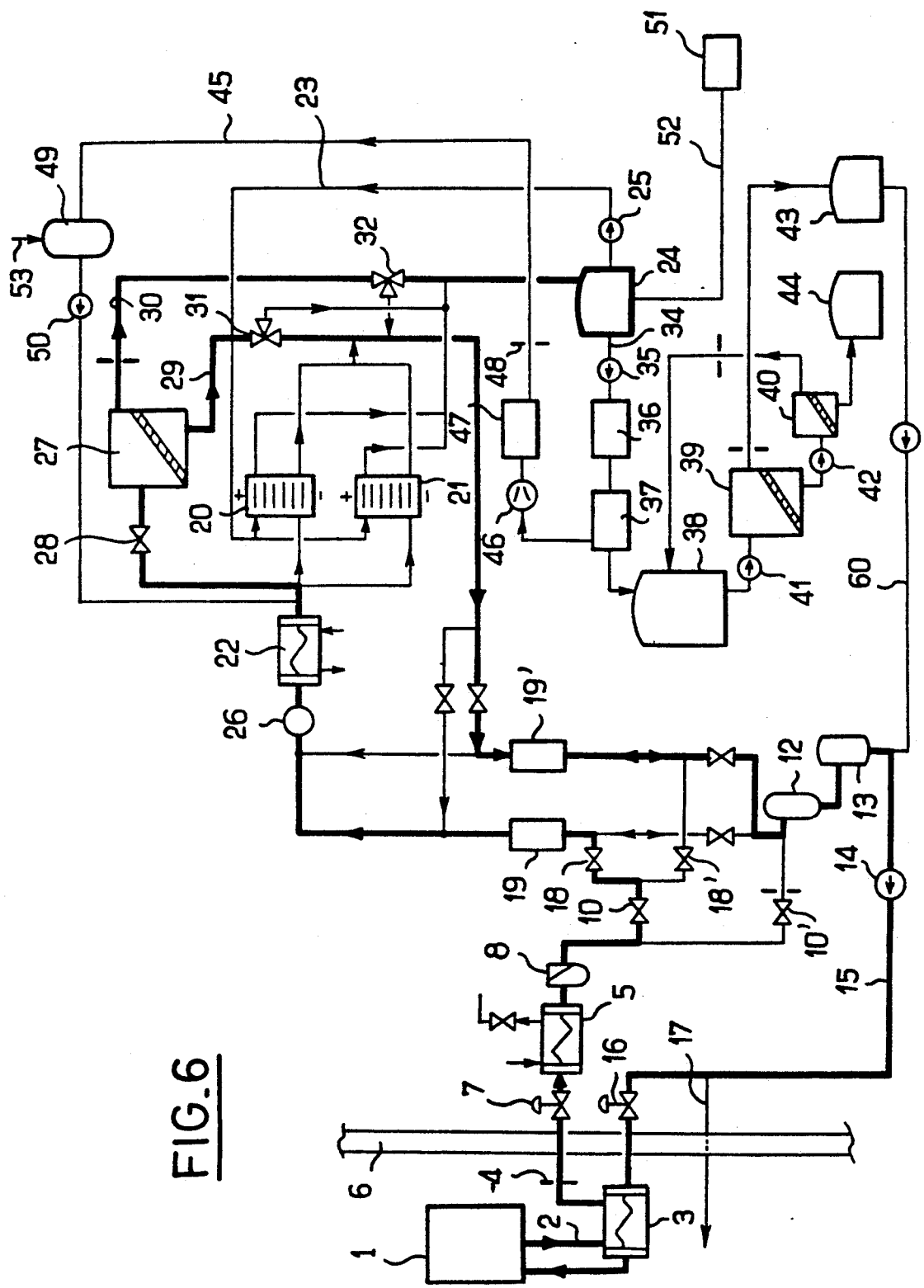
FIG. 6 is a diagrammatic view showing operation of the plant with respect to the reverse osmosis apparatus with reduction of the soluble-poison concentration.
Figure 7:
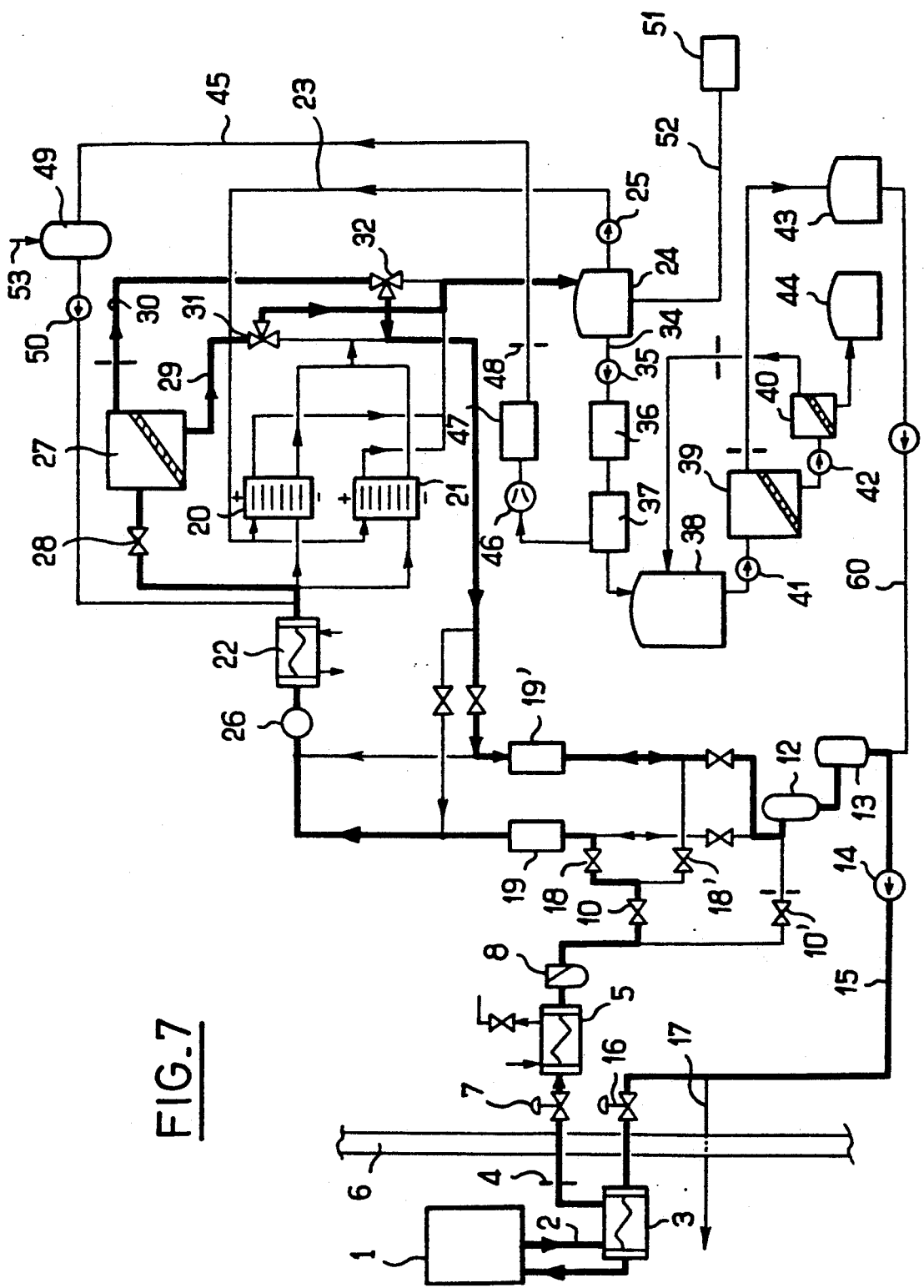
FIG. 7 is a schematic view showing operation of the plant with respect to the reverse osmosis apparatus with an increase of the soluble-poison concentration.

The arrangement of one of these electrodialysis modules is shown schematically in FIGS. 4 and 5 where, for reasons of clarity, a small number of compartments has been shown.

The primary cooling fluid circuit, after passing into the heat exchanger 22, is divided so that the latter circulates inside one compartment of two compartments (a). In the other compartments, (b), the fluid from the circuit for modifying the soluble poison concentration circulates, via the pipe 23.

When it is necessary to increase the soluble-poison concentration in the primary cooling fluid, in this case the boron concentration in the example chosen, the electrodialysis modules 20 and 21 are supplied with direct current, as indicated in FIG. 4. Under the effect of this electric current, circulating between the anode and the cathode, a transfer of anions through the anion exchange membranes (AEM) and of cations through the cation exchange membranes (CEM) takes place. Owing to the organization of the fluid circuits inside the various compartments of the module, there results an increase in the ion, in particular BO$_2$ anion and NH$_4$ cation, concentration of the cooling fluid, and a corresponding reduction in the concentration of the fluid of the circuit for modifying the boron concentration.

On the other hand, when the boron concentration in the cooling fluid is too high and must be reduced, the electrodialysis modules 20 and 21 are supplied with direct current, as indicated in FIG. 5, i.e., with the polarity of the electrode plates reversed compared to the mode of operation described above. In this case, there is a transfer of ions from the compartments (a) to the compartments (b), and in particular of BO$_2$ anion through the anion exchange membranes (AEM) and of NH$_4$ cations through the cation exchange membranes (CEM). This thus results in a reduction in the boron concentration of the primary cooling fluid and a corresponding increase in the concentration of the fluid of the circuit for modifying the boron concentration.

After passing through the electrodialysis modules 20 and 21, the cooling fluid is directed towards the second bed of cationic resins 19', which fixes the ions which had been extracted from the bed 19. The cooling fluid is then ready to follow the return circuit towards the primary circuit 1.

It is also possible to reverse the direction of circulation of the fluid in the ion exchange beds 19 and 19'. In fact, in the preceding description, it has been assumed that the cooling fluid passes through the bed 19 upstream of the electrodialysis modules 20 and 21, and the bed 19' downstream of the latter; at the end of a certain period of operation, the "upstream" bed from which the ions are extracted no longer contains an adequate amount thereof, while the "downstream" bed which fixes the ions becomes saturated.

In order to determine the moment when this reversal must be performed, a pulse counter 26 totals the throughput of cooling fluid supplied to the electrodialysis module 20 and 21. When the counter 26 totals a certain throughput, reversal is performed automatically.

When the boron concentration of the cooling fluid is sufficiently high, above 500 ppm, and when the variation in this concentration is not very high, less than 50 ppm per hour, the electrodialysis modules 20 and 21 are used only as shown in FIG. 3.

However, when the boron concentration is less than 500 ppm or when the variation in concentration must be greater than 50 ppm per hour, the electrodialysis modules 20 and 21 may prove to be insufficient. In fact, under these conditions, modification of the boron concentration is possible, but lengthy. These conditions exist at the end of the life cycle of the fuel, when the quantity of boron reaches a low level or during operational transitions (restarting after stopping when hot, and maximum poisoning of the core by the xenon, etc.), or when the variation of the concentration is large.

Under these conditions, the reverse osmosis apparatus 27 is used either alone or in combination with the electrodialysis modules 20 and 21. Start-up of the apparatus 27 is effected by a valve 28. Opening and closing of this valve may be performed automatically as a function of the boron concentration. The reverse osmosis apparatus 27 is a conventional apparatus comprising membranes which enable the cooling fluid to be separated into two solutions, one solution with a very low boron concentration which is removed from the reverse osmosis apparatus 27 via the line 29, and a second solution with a very high boron concentration which is removed via the line 30.

If it is required to reduce the boron concentration of the cooling fluid (FIG. 6), the three-way cock 31 is opened so that the fluid removed via the line 29 is directed towards the bed 19' (or 19) so as to rejoin the primary circuit 1. In this case, the three-way cock 32 is open so that the fluid removed via the line 30 is directed towards the effluent tank 24.

On the other hand, if it is required to increase the boron concentration of the cooling fluid (FIG. 7), the fluid in the line 29 is directed towards the effluent tank 24 and the fluid in the line 30 towards the bed 19' (or 19). In this case, concentrated boron solution contained in the tank 43 is injected via the line 60.

The plant described above has numerous advantages. It allows large volumes of cooling fluid to be continuously and rapidly processed within a wide range of concentration of the soluble poison. The same plant is used to increase or decrease the concentration of the poison.

Start-up and stoppage of the plant, as well as reversal of operation, may be automated and performed very rapidly.

Moreover, processing of the cooling fluid does not lead to the formation of a large volume of effluents, since the electrodialysis modules 20 and 21 do not increase the volume of the effluents, but have the sole effect of concentrating or diluting the fluid contained in the closed circuit 23 connected to the effluent tank 24.

However, if the reverse osmosis apparatus 27 is used solely or in combination with the electrodialysis modules 20 and 21, the volume of effluents stored in the tank 24 will increase.

To this end, in order to process the effluents, the line 34 conveys the effluents removed from the tank 24 (FIG. 8) first of all into the mixed-bed demineralizer 36, then into the module 37 for thermal dissociation of the ammonium borates, and finally into the tank 38 inside which the effluents are stored until there is a sufficiently large volume thereof to start the processing operation. Processing is performed by the two reverse osmosis apparatuses 39 and 40 mounted in series, and the pressurization of these apparatuses and the circulation of the fluid is ensured by the two pumps 41 and 42. The apparatuses 39 and 40 enable the effluents to be separated into a concentrated solution of poison, stored in 43, and of water stored in 44. The concentrated solution of poison leaving the apparatus 40 is recycled towards the tank 38 so as to admit into the tank 43 only a concentrated solution with a constant high level, preferably in the region of 7000 ppm.

Moreover, the line 45 (FIG. 8) makes up for the ammonia solution losses which inevitably occur in the electrodialysis modules 20 and 21, the ammonia solution escaping towards the effluent tank 24. The readjusting line 45 removes the effluents after degassing thereof, i.e., at the outlet of the module 37. The module 37 also enables the ammonia to be separated from the other gases dissolved in the effluents, such as hydrogen or xenon. The ammonia solution obtained at the outlet of the tank 49 is injected into the electrodialysis modules 20 and 21 when this is necessary, by means of the pump 50.

The invention is not limited to the embodiment described above solely by way of example.

Thus, the number of electrodialysis modules is not absolutely restrictive and depends in particular on the desired variations in concentration and the soluble poison concerned.

The beds of cationic resins 19 and 19' may be replaced by zeolites, in the case where the additive intended to promote the dissociation of the boric acid is not ionized, the beds of the cationic resins being used solely for an ionized additive.

The beds 19 and 19' may also be replaced by an ultrafiltration device; the additive injected in this case consists of basic compounds with large molecules, for example of the amine type, and, upon returning from the electrodialysis modules, the cooling fluid passes through an ultrafiltration module which retains the basic compounds.

Moreover, the effluent processing circuit C may also use electrodialysis modules rather than reverse osmosis modules. It is sufficient to replace the modules 39 and 40 by one or more electrodialysis modules mounted in series or in parallel.

We claim:

1. Method for modifying the concentration of boric acid in the form of soluble poison contained in cooling fluid of a primary circuit of a nuclear reactor, comprising the steps of
   (a) removing said cooling fluid from said primary circuit (1);
   (b) monitoring said concentration of boric acid in said cooling fluid;
   (c) as a function of said concentration of said cooling fluid, selectively passing all of said cooling fluid into at least one electrodialysis module, and alternatively passing only a first part of said cooling fluid into electrodialysis modules and a second part towards at least one reverse osmosis apparatus;
   (d) adding an additive promoting dissociation of said boric acid to said cooling fluid when said cooling fluid leaves said primary circuit; and
   (e) returning said cooling fluid into said primary circuit.

2. Method according to claim 1, wherein said additive is ammonia solution.

3. Method according to claim 2, including the step of readjusting the content of ammonia solution of said cooling fluid of said primary circuit upstream of said electrodialysis modules and of said reverse osmosis apparatus.

* * * * *